(12) United States Patent
Holbein et al.

(10) Patent No.: US 9,630,587 B2
(45) Date of Patent: Apr. 25, 2017

(54) SEAT BELT BUCKLE PRESENTER

(71) Applicant: TRW AUTOMOTIVE GMBH, Alfdorf (DE)

(72) Inventors: Wolfgang Holbein, Aldforf (DE); Jens Klaassen, Alfdorf (DE)

(73) Assignee: TRW Automotive GmbH (DE)

( * ) Notice: Subject to any disclaimer, the term of this patent is extended or adjusted under 35 U.S.C. 154(b) by 0 days.

(21) Appl. No.: 14/898,492

(22) PCT Filed: Jun. 26, 2014

(86) PCT No.: PCT/EP2014/001745
§ 371 (c)(1),
(2) Date: Dec. 15, 2015

(87) PCT Pub. No.: WO2015/000566
PCT Pub. Date: Jan. 8, 2015

(65) Prior Publication Data
US 2016/0121844 A1 May 5, 2016

(30) Foreign Application Priority Data
Jul. 2, 2013 (DE) .................. 10 2013 011 025

(51) Int. Cl.
B60R 22/20 (2006.01)
B60R 22/03 (2006.01)
A44B 11/25 (2006.01)
B60R 22/18 (2006.01)

(52) U.S. Cl.
CPC .......... *B60R 22/20* (2013.01); *A44B 11/2503* (2013.01); *B60R 22/03* (2013.01); *B60R 2022/1806* (2013.01)

(58) Field of Classification Search
CPC . B60R 22/20; B60R 22/03; B60R 2022/1806; A44B 11/2503
See application file for complete search history.

(56) References Cited

U.S. PATENT DOCUMENTS

| 4,469,352 A | * | 9/1984 | Korner ................. B60R 22/201 280/801.2 |
| 5,615,917 A | * | 4/1997 | Bauer ................... B60R 22/201 280/801.2 |
| 2004/0000783 A1 | | 1/2004 | Biller et al. |
| 2005/0224270 A1 | | 10/2005 | Holbein et al. |
| 2006/0108786 A1 | * | 5/2006 | Sugiyama .............. B60R 22/03 280/801.1 |
| 2008/0290644 A1 | | 11/2008 | Spahn et al. |

(Continued)

FOREIGN PATENT DOCUMENTS

| DE | 10328560 | 1/2005 |
| DE | 102011008775 | 7/2012 |

(Continued)

*Primary Examiner* — Drew Brown
(74) *Attorney, Agent, or Firm* — Tarolli, Sundheim, Covell & Tummino LLP

(57) ABSTRACT

A belt buckle feeder (10) comprises a belt buckle (18), a stationary base member (12) to be mounted fixedly on the vehicle and a motor-driven slide (16) movably supported on the base member (12) to which the belt buckle (18) is coupled, wherein the slide (16) encloses the base member (12) at least in portions.

10 Claims, 2 Drawing Sheets

(56) References Cited

U.S. PATENT DOCUMENTS

2015/0203069 A1* 7/2015 Hoika ................ B60R 22/03
                                                    280/807
2015/0307060 A1* 10/2015 Arnold ............... B60R 22/03
                                                    297/469

FOREIGN PATENT DOCUMENTS

| DE | 102011008778 | 7/2012 |
| DE | 102011008779 | 7/2012 |

\* cited by examiner

SEAT BELT BUCKLE PRESENTER

RELATED APPLICATIONS

This application corresponds to PCT/EP2014/001745, filed Jun. 26, 2014, which claims the benefit of German Application No. 10 2013 011 025.4, filed Jul. 2, 2013, the subject matter of which are incorporated herein by reference in their entirety.

BACKGROUND OF THE INVENTION

The invention relates to a belt buckle feeder.

Belt buckle feeders serve for designing the buckling and unbuckling more conveniently for a vehicle occupant by moving the belt buckle into a comfort position which can be easily reached by the vehicle occupant. After inserting the plug-in tongue the belt buckle is lowered from the comfort position into a home position again where it remains during traveling. Before unbuckling, the belt buckle can be lifted into the comfort position again.

From DE 10 2004 017 457 A1, for example, a belt buckle feeder comprising a spindle drive is known in which an electric motor makes a spindle rotate, thus causing a spindle nut coupled to the belt buckle via a steel rope to be displaced on the spindle.

SUMMARY OF THE INVENTION

It is the object of the invention to provide a belt buckle feeder having an especially compact design.

In accordance with the invention, for this purpose a belt buckle feeder is provided comprising a belt buckle, a stationary base member to be mounted fixedly to the vehicle and a motor-driven slide supported to be movable on the base member to which the belt buckle is coupled, wherein the slide encloses the base member at least in portions. Hence in the belt buckle feeder according to the invention the base member is arranged at least partly inside the slide, enabling an additional casing to be dispensed with and thus a compact design to be obtained.

Preferably, the base member supports at least one driven gearwheel which rolls off the slide. In this way a simple and reliable drive is resulting.

In particular a drive motor for the at least one gearwheel is provided which is equally arranged on the base member. In this way a compact drive is obtained which in addition is accommodated in the vehicle being protected by the slide.

According to a preferred embodiment, the at least one driven gearwheel is part of a worm gear. The latter excels by very high loading capacity due to the layout and the multiple simultaneous tooth mesh.

An especially stable and loadable configuration is achieved in that the base member preferably supports two driven gearwheels. They can especially be driven by a common worm wheel arranged between the gearwheels.

A simple design results from the fact that according to a preferred configuration the slide has an embossed toothed rack contour for rolling off the at least one gearwheel.

Preferably, on opposite inner sides of the slide toothed racks are embossed, wherein especially the base member supports two gearwheels each of which is engaged in a toothed rack.

An especially simple configuration is achieved when the slide is designed as a C-rail. The latter can be additionally reinforced by cross members on the open side. In this way the C-rail is partially closed.

In particular, at least one gear wheel arranged at the base member is surrounded by the C-rail and thus accommodated in a protected manner.

In a development of the invention the at least one gearwheel includes a freely projecting stub shaft sliding along free edges of the C-rail.

The free edge of the C-rail especially includes a projection which serves as a stop for the stub shaft and thus for limiting the relative movement between the base member and the slide.

BRIEF DESCRIPTION OF THE DRAWINGS

Further features and advantages of the invention result from the following description of a preferred embodiment by way of the enclosed drawing, in which.

DESCRIPTION

Figure 1:
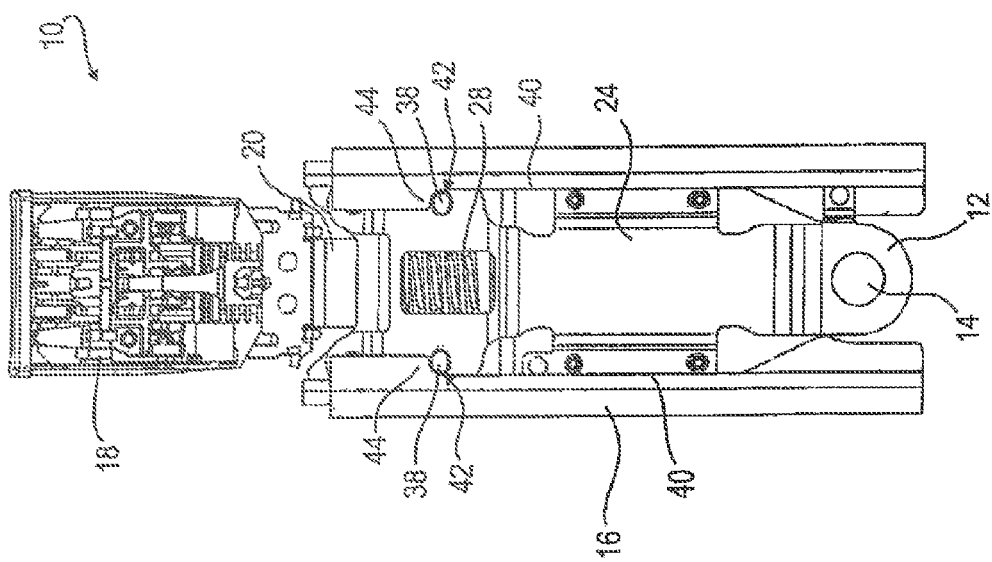
FIG. 1 shows a view of a partly out belt buckle feeder according to the invention.

FIG. 1 illustrates a belt buckle feeder 10 including a stationary base member 12 which is adapted to be mounted fixedly to the vehicle via an opening 14. Furthermore, a slide 16 is provided to which a belt buckle 18 (shown without an encompassing casing here) is coupled and is rigidly or flexibly connected to the slide 16 by a web 20.

The slide 16 is designed as a C-rail and is movably supported on the base member 12. In this way the belt buckle 18 can be displaced between a comfort position in which a plug-in tongue of a seat belt can be easily inserted into the belt buckle 18 and, resp., disengaged therefrom and a home position in which the belt buckle 18 is retained during the driving operation of the vehicle. The movement of the belt buckle 18 is reversible and can be carried out each time when the vehicle occupant gets into and/or off the vehicle.

As can be inferred from FIG. 1, the slide 16 encloses the base member 12 at least in portions, i.e. the base member 12 is arranged in the home position shown in FIG. 1 at least partly inside the slide 16.

At the base member 12, which is a stamped metal part, for example, an electric drive 22 (cf. FIG. 2) is provided for the belt buckle feeder 10 which is protected against impurities by a cover 24 (cf. FIG. 1) at the base member 12. The cover 24 may be designed as a one-piece or multi-piece component.

The drive 22 comprises a drive motor 28 (see especially FIGS. 2 to 4) which is arranged at the base member 12 and drives a shaft in the form of a worm wheel 28 provided in the axial direction A in direct extension of the drive motor 26.

The drive 22 further comprises two driven gearwheels 30 in the form of spur wheels which are equally arranged on the base member 12 and are both driven by the worm wheel 28. Hence the drive 22 is a worm gear.

Figure 2:
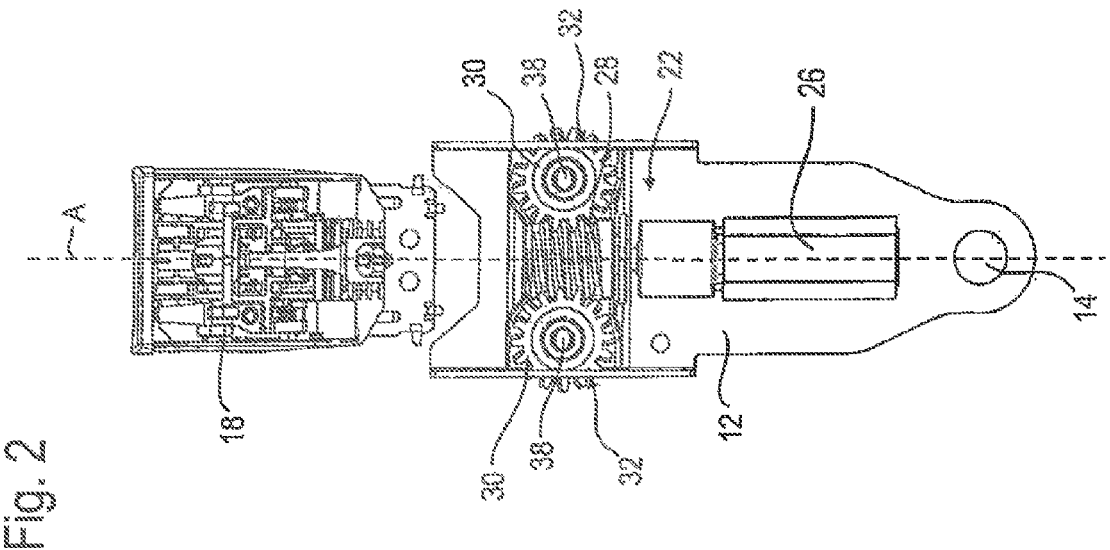
FIG. 2 shows a view of a base member used in the belt buckle feeder from FIG. 1 including a belt buckle.
Figure 3:
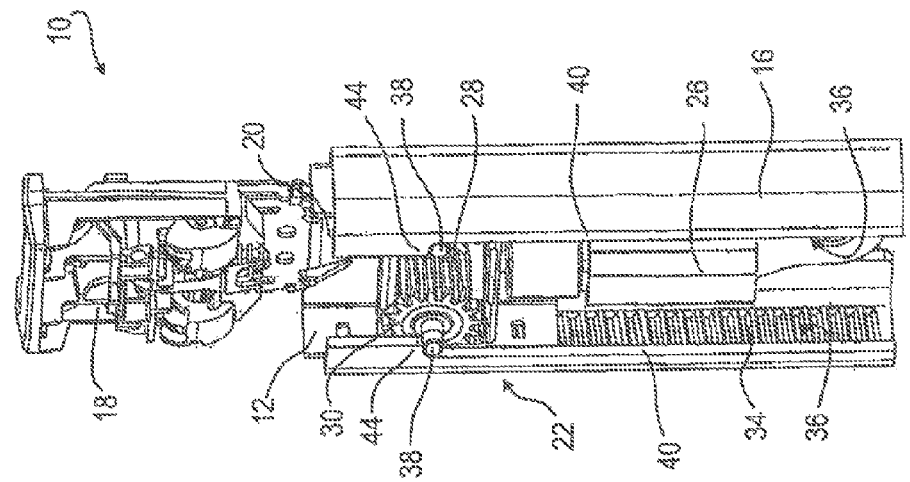
FIG. 3 shows a perspective view of the base member and the base buckle from FIG. 2, with parts being omitted for the purpose of clarity.

Concerning the FIGS. 2 and 3 if has to be noted that the belt buckle 18 is not represented to be coupled to the base member 12. Here merely their position relative to each other in the home position is clarified.

Figure 4:
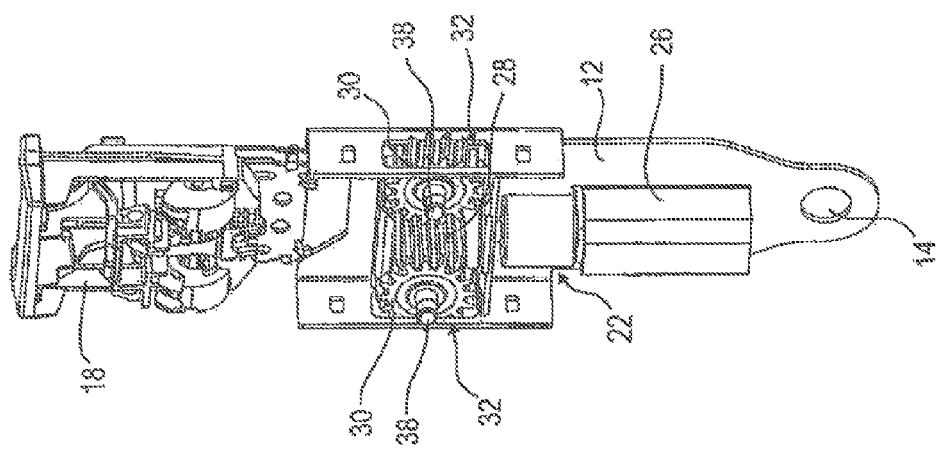
FIG. 4 shows a perspective view of the belt buckle feeder from FIG. 1, but without a cover.

As is furthermore evident from FIGS. 2 and 3, the base member 12 has a U-shaped basic design in the area of the gearwheels 30, with lateral recesses 32 being provided which enable the gearwheels 30 to roll off the slide 16, more exactly speaking toothed racks 34 which are embossed on opposing inner skies 36 of the slide 16 (see FIG. 4 in this respect).

The gearwheels 30 arranged at the base member 12 are almost completely surrounded by the slide 16 in the form of a C-rail.

The gearwheels 30 include freely projecting stub shafts 38 which are displaced at the free edges 40 of the slide 16 in the form of a C-rail with or without, contacting the rail 16 (see FIGS. 1 and 4). For this purpose, the stub shafts 38 extend through recesses 42 of the cover 24 stabilizing the axes of the gearwheels 30.

In the upper area of the slide 16 each of the free edges 40 has a projection 44 serving as a stop for the stub shafts 38 and predefining the home position of the belt buckle feeder 10.

The C-shaped slide 16 encloses the U-shaped base member 12 with its free longitudinal edges bent toward each other. The free longitudinal edges of the base member 12 are preferably adjacent to the inner sides of the free longitudinal edges of the slide 16 bent toward each other as spacers so as to guide said slide free of play where possible. In order to reduce friction and noise sliding elements which are known per se and are not shown here can be arranged between the base member 12 and the slide 16.

As an alternative to the shown embodiment comprising two driven gearwheels 30, it is also imaginable, of course, to provide only one driven gearwheel and, analogously, only one toothed rack contour embossed in the slide 16.

Equally, the worm 28 could also be driven via a flexible shaft instead of directly by the drive motor 26.

In the case of the belt buckle feeder 10 according to the invention, the compact design, the protected housing of the drive 22 in the interior of the slide 16 and the fact that the displaceable slide 16 itself constitutes sort of a casing for the belt buckle feeder 10 have to be especially emphasized.

The invention claimed is:

1. A belt buckle feeder comprising a belt buckle (18), a stationary base member (12) to be mounted fixedly on the vehicle and a motor-driven slide (16) movably supported on the base member (12) to which the belt buckle (18) is coupled, wherein the slide (16) encloses the base member (12) at least in portions, and wherein a drive motor (26) is arranged at the base member (12) and inside the slide (16).

2. The belt buckle feeder according to claim 1, wherein the base member (12) supports at least one driven gearwheel (30) which rolls off the slide (16).

3. The belt buckle feeder according to claim 2, wherein a drive motor (26) for the at least one gearwheel (30) which is equally arranged at the base member (12) is provided.

4. The belt buckle feeder according to claim 2, wherein the at least one driven gearwheel (30) is part of a worm gear.

5. The belt buckle feeder according to claim 2, wherein the base member (12) supports two driven gearwheels (30).

6. The belt buckle feeder according to claim 2, wherein the slide (16) includes an embossed toothed rack contour for roll-off of the at least one gearwheel (30).

7. The belt buckle feeder according to claim 6, wherein on opposite inner sides (36) of the slide (16) toothed racks (34) are embossed.

8. The belt buckle feeder according to claim 1, wherein the slide (16) is in the form of a C-rail.

9. The belt buckle feeder according to claim 8, wherein at least one gearwheel (30) arranged on the base member (12) is surrounded by the C-rail.

10. The belt buckle feeder according to claim 9, wherein the at least one gearwheel (30) includes a freely projecting stub shaft (38) sliding along free edges (40) of the C-rail.

* * * * *